Jan. 1, 1935. E. WOOD 1,985,966
ANTIGLARE DEVICE FOR AUTOMOBILE HEADLIGHTS
Filed Oct. 27, 1932
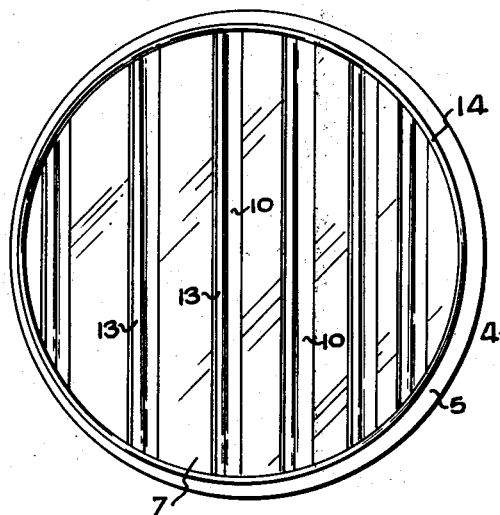
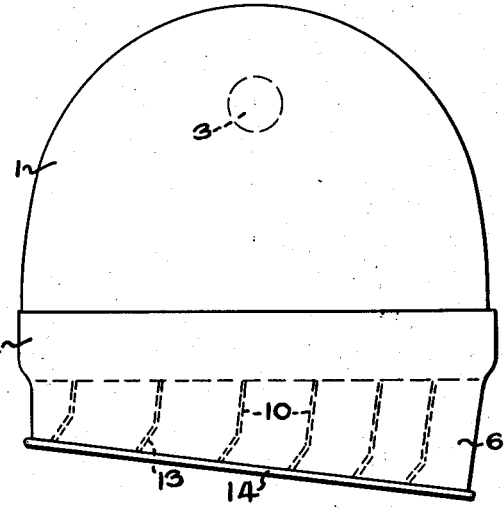
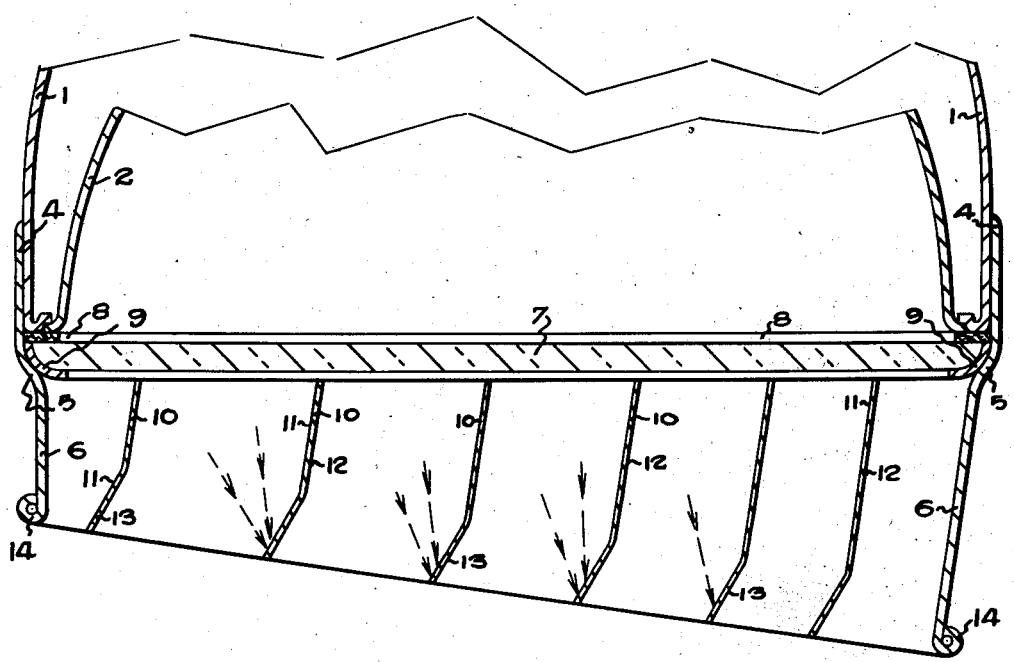
Inventor
Edward Wood Patented Jan. 1, 1935

1,985,966

UNITED STATES PATENT OFFICE 1,985,966

ANTIGLARE DEVICE FOR AUTOMOBILE HEADLIGHTS

Edward Wood, Hamilton, Ontario, Canada

Application October 27, 1932, Serial No. 639,909

1 Claim. (Cl. 240—48.4)

My invention relates to improvements in antiglare devices for attachment to automobile headlights for the purpose of preventing excessive glare from the direct or reflected rays from blinding the eyes of drivers in control of approaching vehicles and at the same time to permit the headlight to maintain its full beam throwing capacity.

A further object of my invention is to so construct my device that it can be attached to any standard headlight in lieu of the standard bezel or rim furnished, and a still further object of my invention is to so construct my device that it will in no way mar the appearance of the headlight and can be attached without any alterations to the headlight structure apart from the replacing of the bezel.

A still further object of my invention is to utilize the principle of vertical light ray deflecting vanes or ribs positioned across the headlight lens and to so construct and position my vanes that the anti-glare properties of my invention will be superior to this type of device used heretofore.

My invention consists of an anti-glare device constructed and arranged all as hereinafter more particularly described and illustrated in the accompanying drawing in which:

Fig. 1 is a front elevational view of a headlight furnished with my device.

Fig. 2 is a plan view of the headlight shown in Fig. 1, and

Fig. 3 is an enlarged horizontal cross sectional view through the forward portion of the headlight shell showing my device attached thereto.

Like characters of reference indicate corresponding parts in the different views in the drawing.

The numeral 1 indicates an automobile headlight shell of the standard type, suitably supported upon a bracket which is not shown as it forms no part of the invention. Interiorly of the shell is positioned the parabolic reflector 2 as is usually furnished and 3 indicates the headlight bulb which is positioned in line with the focal point of the reflector. In modern headlight construction, the lens is usually retained in position at the front of the shell 1 by a rim or bezel of L shaped cross section which extends around the edge of the lens and also around the forward portion of the shell. My device replaces this rim or bezel which is removed.

My invention comprises a cylindrical rim or bezel portion 4 which is adapted to surround the forward portion of the headlight shell and replace the standard rim. The rim 4 is curved inwardly to a reduced diameter at a point 5 in front of the edge of the headlight shell from where it extends forwardly in the form of a sleeve or collar 6.

The headlight lens 7 is positioned across the face of the shell 1 in the usual manner, that is, being furnished upon its rear face with a cork or fibre ring washer 8 which is positioned between the lens and the forward edges of the reflector and shell. The lens is retained in place by the inwardly curved reduced diameter portion 5 of my device and in order to provide a dust proof joint I furnish a ring 9 of substantially L shaped cross section which extends around the peripheral edge of the lens and fits between the lens and the portion 5 of my device. It will thus be seen that when my rim 4 is positioned upon the shell 1 and forced rearwardly into the locked position that the lens 7 will be tightly held between my device and the headlight shell and the reflector.

The sleeve 6 which protrudes forwardly has its forward edge angularly inclined in a horizontal direction, that is, that portion of the sleeve adjacent to the oncoming traffic or passing cars is extended forwardly a greater degree than the portion of the sleeve adjacent to the ditch or the right hand side of the road.

The sleeve 6 is furnished to carry a plurality of spaced apart vertical vanes 10 which are inclined with respect to the axis of the reflector so that any rays of light striking the faces 11 of the vanes are thrown to the right hand side of the road while other rays extending substantially parallel to the axis of the reflector are projected forwardly in the normal manner. In practice I silver the sides 11 of the vanes 10 in order to secure a maximum reflection and blacken the sides 12 of the vanes so as to deaden reflection. The portion of the sleeve 6 adjacent to the centre of the road or the oncoming traffic is inclined to lie substantially parallel of the vanes 10 as is clearly shown in the drawing, in order to assist in the diverting of the vivid rays.

I have found, through experimentation with various types of anti-glare devices incorporating vertical vanes, that in cases where the vanes lie substantially parallel to the axis of the reflector that unless they are placed comparatively close together they do not block the glaring rays from extending to the left hand side of the road or in other words, into the eyes of approaching drivers. If the vanes of this type are placed sufficiently close together to cut out the blinding rays they have to be so numerous that they reduce the beam throwing capacity of the headlight. Other contributors to this art have inclined the vanes so that a greater proportion of the light rays are deflected to the right hand side of the road, but even with this improvement the number of vanes required for satisfactory results were too great not to affect the beam throwing capacity of the headlight.

In experimentation with my invention, I have found that the most satisfactory results are obtained by setting the forward portions 13 of the vanes at an inclination to be the body portions of the vanes so that glaring rays passing between the vanes and inclined to the centre of the road impinge against the faces of such inclined portions and are deflected to the right, this function being particularly true in the case of rays which project in a left hand direction towards approaching traffic and which are indicated by dotted arrows in the drawing. I have also found it advantageous to so position my vanes that they are in closer relation upon the left hand side of my headlight wherein they block a greater percentage of glaring rays projecting towards the oncoming traffic and by my particular construction I have found it only necessary to provide a comparatively small number of vanes, for example the six illustrated in the drawing. The rearward edges of the vanes are adapted to lie against the forward face of the ring 9 so that such ring can be made of light material as the vanes assist to retain it in place against the lens.

The vanes can be secured in place in any suitable manner such as by spot welding to the sleeve 6 and the forward edge 14 of the sleeve is rolled outwardly so as to permit drainage of any rain or snow that might accumulate within the sleeve. If it is deemed necessary in certain climates the forward edge 14 of the sleeve 6 may be adapted to receive a second lens provided for the purpose of preventing snow from accumulating in the sleeve, which might possibly happen when driving in a heavy snow fall. This, however, will not be an essential feature in most climates as the heat generated by the headlight will be sufficient to melt any moderate amount of snow collecting in the sleeve.

From the foregoing description, it will be apparent that I have devised a particularly simple and efficient form of anti-glare device which can be readily attached in lieu of the standard headlight rim or bezel and which will satisfactorily carry out its function without it being necessary to in any way mar the appearance of the headlight, and although I have shown and described a particular embodiment of my invention it is to be understood that I can make such changes and alterations as I may from time to time deem necessary without departing from the spirit of my invention as set forth in the appended claim.

What I claim as my invention is:

In an anti-glare device for vehicle headlights, a sleeve adapted to surround the forward portion of the headlight shell, a portion of said sleeve of reduced diameter adapted to project forwardly of the headlight shell and lens at an inclination thereto and constitute means for retaining the headlight lens in place, the forward edge of the sleeve being inclined in respect to the plane of the lens, a plurality of vertical spaced apart vanes contained within the sleeve and between which the light rays pass, and light ray deflecting members formed by the forward portions of the vanes and set at an inclination to the remaining portions of the vanes.

EDWARD WOOD.